(12) United States Patent
Kadah

(10) Patent No.: US 6,753,670 B2
(45) Date of Patent: Jun. 22, 2004

(54) UNIVERSAL ENERGY REGULATING CONTROLLER CIRCUIT

(76) Inventor: Andrew S. Kadah, 5000 Hennaberry Rd., Manlius, NY (US) 13104

( * ) Notice: Subject to any disclaimer, the term of this patent is extended or adjusted under 35 U.S.C. 154(b) by 153 days.

(21) Appl. No.: 10/091,195

(22) Filed: Mar. 6, 2002

(65) Prior Publication Data

US 2003/0169014 A1 Sep. 11, 2003

(51) Int. Cl.[7] .............................. H02P 5/28; H02P 7/36
(52) U.S. Cl. ....................... 318/727; 318/797; 318/798; 318/799; 318/800; 318/801; 318/807; 318/811; 318/812
(58) Field of Search .................... 318/44, 700, 727, 318/797, 798, 899, 800, 801, 807, 811, 812

(56) References Cited

U.S. PATENT DOCUMENTS

| | | | | |
|---|---|---|---|---|
| 3,568,021 A | * | 3/1971 | Turnbull | 318/227 |
| 3,588,650 A | | 6/1971 | Bevis | 318/227 |
| 3,757,184 A | * | 9/1973 | Chute | 318/231 |
| 4,958,118 A | * | 9/1990 | Pottebaum | 318/727 |
| 5,045,989 A | * | 9/1991 | Higaki et al. | 363/31 |
| 5,099,410 A | * | 3/1992 | Divan | 363/98 |
| 5,146,147 A | * | 9/1992 | Wills et al. | 318/797 |
| 5,252,905 A | * | 10/1993 | Wills et al. | 318/807 |
| 5,276,392 A | * | 1/1994 | Beckerman | 318/751 |
| 5,283,726 A | * | 2/1994 | Wilkerson | 363/41 |
| 5,767,653 A | * | 6/1998 | DeFiore et al. | 318/811 |
| 5,818,194 A | * | 10/1998 | Nordby | 318/101 |
| 5,828,200 A | * | 10/1998 | Ligman et al. | 318/807 |
| 5,883,490 A | * | 3/1999 | Moreira | 318/807 |
| 6,051,952 A | | 4/2000 | Moreira et al. | 318/738 |

* cited by examiner

Primary Examiner—Robert Nappi
Assistant Examiner—Tyrone Smith
(74) Attorney, Agent, or Firm—Bernhard P. Molldrem, Jr.

(57) ABSTRACT

A power controller for applying power to an induction motor or similar AC load has a variable drive circuit for staring and switching a portion of the AC input line power. In one mode, the input line power is fed straight through to the load. In another mode, the AC waveform is reshaped to improve the power factor or to boost its RMS value, e.g., for brownout protection. In a further mode the output power can be provided at a different frequency from the input line power. Vector control increases efficiency through power optimization, with sensing of load requirements. Sensing of regeneration pulses at the commencement of a half cycle can be employed for direct sensing of motor speed or load.

20 Claims, 5 Drawing Sheets

FIG.8A MODERATE LOAD

FIG.8B LIGHT LOAD

FIG.8C NO LOAD

FIG.8D "LOCK ROTOR" (NO REGENERATIOM)

UNIVERSAL ENERGY REGULATING CONTROLLER CIRCUIT

BACKGROUND OF THE INVENTION

The present invention relates to drive circuits that provide AC power (or in some cases DC power) to a motor armature or other AC load or to a reversing load, and is more particularly directed to a control circuit that provides AC power at a frequency, wave shape, and power factor that is tailored for an AC or inductive load that may vary during use, such as a single-phase AC induction motor, an example of which is a motor used to drive a compressor or blower in a HVAC application. The invention is more specifically concerned with a control circuit for applying drive power to a motor which may be from fractional horsepower to several horsepower or above in size; in which a torsional load varies depending upon external factors, and in which the motor torque can depend on the condition or quality of the AC line power; and in which the applied line voltage can drop from a nominal 117 volts (RMS) to below 100 volts, in which the power factor or phase angle can be significant; and in which the line frequency may drop well below the nominal 60 Hz (e.g., where the power is locally generated). Such drive power control circuits may have numerous industrial, commercial, and domestic applications.

In refrigeration and HVAC systems, it is often necessary to change the fan speed or blower speed or compressor speed according to existing conditions. For example, because cold, dry air is considerably heavier than warm moist air, during initial operation the blower has to operate at high speed to pump conditioned air, especially to higher floors. Then, when the comfort space or living space has cooled down, the fan speed is reduced to avoid blowing cold air directly on human occupants. Also, where sensible cooling is needed, rather than latent cooling the blower is operated at higher speed to increase air flow. Correspondingly, if dehumidification is required more than sensible cooling, the air flow rate should be reduced, requiring a slower blower speed. Likewise, as the demand for cooling changes, the need for liquid refrigerant through the system will also vary, and so compressor speed may need to be increased at times and reduced at other times.

Also, during many peak demand times, the quality of the AC line power can vary enormously, with changes in line voltage and line frequency. Typically, the motor designer is forced to over-design the motor in order to satisfy load requirements over an expected range of input conditions. The motor armature, which is basically an inductive load, may have to face an unfavorable power factor, which means that the actual applied voltage, i.e., the real component of the complex AC voltage, may become unacceptably low. Consequently, it is desirable to be able to adjust the shape and RMS value of the line voltage so that the motor will operate optimally, even under adverse line conditions.

It is well known that for an AC induction motor, the output torque is proportional to the square of the input voltage. It is also the practice for any given application to use a motor that is rated over a given voltage range of ±10%. This means that the system has to be over-designed to meet full load requirements at low voltage. Otherwise, for a given AC induction motor, if the input voltage is 10% low, i.e., $V=90\% \ V_{normal}$, then output torque T drops to $T=81\% \ T_{normal}$. This means that, according to conventional practice, the motor has to be over-designed by at least 19%. Consequently, at normal or high line conditions, over 20% of the electric energy is wasted.

One approach to motor control, which was intended for create control over motor speed, has been an adjustable speed drive (ASD) employing a pulse-controlled inverter. In these ASD's the incoming AC power is rectified to produce a constant DC level, and that is converted to an AC drive wave using pulse-width modulation (PWM). These ASD's overcome the shortcomings of operating induction motors directly on line voltage, and satisfy many of the requirements for speed control. Unfortunately, the use of PWM can lead to other problems, including winding insulation failure in the motor armature. PWM operation can also result in high switching losses, as well. In addition, although the majority of the time, the induction motor concerned can be powered with unmodified line current, when an ASD is used the PWM current is always being supplied to the motor. Not only does this consume power in operation, but the constant charging and discharging of the large power capacitors in the ASD system can limit their useful life.

In many cases, what is needed is to simply modify the existing line AC waveshape to achieve the improved power factor or to boost (or regulate) the effective RMS voltage, but with the ASD system, this is not possible.

Also, previous efforts in brownout protection (i.e., to protect the AC induction motor from burn out in low line voltage situations) have taken the approach of cutting off power to the motor to prevent damage. While this saves the motor, it can cause severe problems for the system that the motor is designed to drive. For example, in a commercial refrigeration application, a freezer system can be used for storage of a frozen food product, e.g., frozen meat, ice cream, or another food product. During a so-called brownout, when the operating line voltage drops below a safe threshold (e.g., reduced from 120 volts RMS to below 95 volts RMS) then the compressor motor is simply shut off, and no refrigeration takes place. If the brownout lasts for a period of an hour or more, the meat may begin to spoil, or the ice cream may melt. It would be more desirable to continue to operate the refrigeration system during brownouts, i.e., by modifying the AC power wave so that it is sufficient to run the equipment, even if at a partial speed. However, that has not been possible with existing power control circuits.

OBJECTS AND SUMMARY OF THE INVENTION

It is an object of this invention to provide AC power to an AC load, such as a motor armature, in a way that avoids the drawbacks of the prior art, as mentioned above.

It is an object of this invention to optimize incoming applied power to avoid waste of electrical energy.

It is another object to provide a motor speed control for efficient operation of a compressor motor, blower motor, or similar inductive load.

It is a further object to provide a motor speed control that is reliable and efficient, and which can accommodate changes in load and changes in line power quality.

If is a yet further object of this invention to detect or measure dynamically the speed of the rotor, and to adjust the power level to match load requirements accordingly.

It is a still further object of this invention to expand the voltage operating range of existing or new equipment above and below the nominal frequency and voltage of the AC line.

If is a further object of this invention to optimize the V/f ratio of an AC induction machine or motor to enhance system efficiency by dynamically sensing rotor slip, monitoring motor current or back EMF amplitude and/or duration, and adjusting power levels accordingly to match load requirements, for both linear and non-linear loads.

It is still another object of this invention to provide a circuit of low-component count, low-loss, and low-cost design.

According to an aspect of the invention, a power controller for powering an induction motor or other AC load (or in some cases a DC motor) employs input conductors that connect with a source of AC line power, the line power having a waveform and a line frequency, and output conductors that connect to an AC load, such as an induction motor. A variable drive circuit receives the line power from the input conductors and delivers properly conditioned AC power via the output conductors to the AC load. The variable drive circuit includes means for storing and switching at least a portion of the incoming line power and then selectively passing the line power, as needed, to the output conductors in a plurality of modes. In a straight-through mode, the input AC line power is applied directly to the load; in another mode, the input AC line power has current added at portions of the waveform to reshape the AC waveform without altering the line frequency; in a completely synthesized wave mode, a reshaped non-sinusoidal waveform (pulse width modulated or filtered, at a selected amplitude) is applied to the load at a frequency that is different from the line frequency. The variable drive circuit can employ a control circuit that has sensor inputs coupled to the output conductors for monitoring and controlling the waveform and frequency of the power applied to the load. As explained later, the load itself can be the sensor, i.e., detecting the amount of rotor slip in the form of back EMF amplitude and/or width.

According to another aspect of the invention, a power controller employs a first AC conductor and a second AC conductor for connecting to an AC line power source, and a first controlled switch circuit which includes a first controlled switch element having a first power terminal connected to said first AC conductor, a second terminal, and a control input, and a diode connected in shunt across the power terminals. A second controlled switch circuit includes a second controlled switch element having a first power terminal connected to said second AC conductor, a second terminal, and a control input, and a diode connected in shunt across the power terminals. A power capacitor has its terminals connected to the second power terminals of said first and second controlled switch elements, respectively. Load terminals are coupled to the terminals of said power capacitor. A control circuit has at least one output coupled to the control inputs of the first and second controlled switch elements, and at least one sensor input connected to at least one of said load terminals.

Preferably, the first and second controlled switching elements each include a switching transistor, such as a MOSFET bipolar transistor or an IGBT. Optical devices, e.g., optocouplers, couple the control circuit with the control inputs of first and second controlled switch elements. As used here and in the ensuing claims, the term transistor is meant to include any controlled semiconductor device, also including photodiodes, SCRs, triacs, PUTs, as well as the more traditional MOSFET or bipolar transistors and IGBT thyristors. In many situations, vacuum tubes are equivalent to transistors.

According to another embodiment of the invention, a motor speed controller for powering a single phase induction motor, comprises a first AC conductor and a second AC conductor for connecting to a source of AC line power. A first controlled switch circuit which includes a first controlled switch element has a first power terminal connected to the first AC conductor, a second power terminal, and a control input, and a first diode connected in shunt across the power terminals. A second controlled switch circuit has a second controlled switch element having a first power terminal connected to the second AC conductor, a second power terminal, and a control input, and a second diode connected in shunt across the power terminals. A first power capacitor has a first terminal and a second terminal, with a third controlled switch disposed between the first terminal of the first power capacitor and the second power terminal of the first controlled switch element. The third controlled switch circuit has a third controlled switch element and a third diode connected in shunt across said third controlled switch element. A second power capacitor has a first terminal and a second terminal, with a fourth controlled switch circuit disposed between the first terminal of the second power capacitor and the second power terminal of the second controlled switch element. The fourth controlled switch circuit has a fourth controlled switch element and a fourth diode connected in shunt across the fourth controlled switch element. The third and fourth controlled switch elements each have a respective control input.

Load terminals are coupled to the second power terminals of the first and second controlled switch elements, and a control circuit has at least one output coupled to the control inputs of the first, second, third, and fourth controlled switch elements, and at least one sensor input connected to at least one of the load terminals.

The second terminals of said first and second power capacitors are coupled to the second AC conductor and the first AC conductor, respectively. The second terminals of the first and second power capacitors are coupled to the second power terminals of the second controlled switch element and of the first controlled switch element, respectively.

The control circuit can be optically coupled to the first, second, third and fourth controlled switch elements.

The principles of this invention can also be embodied in a single-MOSFET switched bridge circuit, in which the armature of the AC induction motor (or other load) is connected in series with the AC inputs of a diode bridge. This can be realized in single-phase or polyphase modes.

The drive circuit can boost portions of the original AC power waveform, or can supply a synthesized waveform, which can be at a desired frequency and amplitude.

The drive circuit of this invention is of a simple, straightforward design, being inherently compact and relatively inexpensive, and at the same time avoiding energy waste.

The above and many other objects, features, and advantages of this invention will become apparent from the ensuing description of a preferred embodiment, which should be read in conjunction with the accompanying Drawing.

DETAILED DESCRIPTION OF A PREFERRED EMBODIMENT

Figure 1:
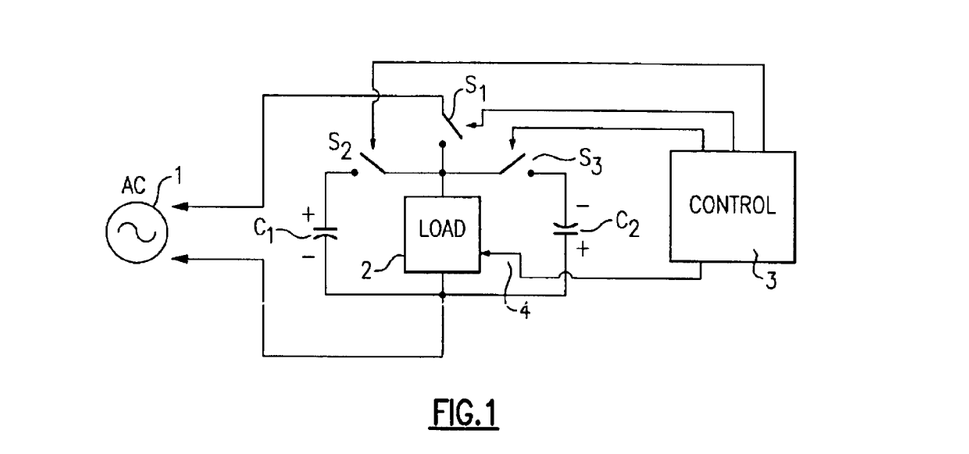
FIG. 1 is a schematic circuit diagram for explaining the basic concepts of this invention.

With reference to the Drawing, FIG. 1 is a basic schematic view of a circuit employing the general concepts of this invention, and receiving AC power from a source 1 and applying it to a load 2. A first controlled switch S1 is interposed between the source and the load 2, and there are also second and third controlled switches S2 and S3 that are selectively opened and closed for charging first and second capacitors C1 and C2. A control circuit 3 applies switching signals to the controlled switches S1, S2, and S3, and may have a sensor input 4 coupled to the load 2.

With this arrangement, the capacitors C1 and C2 can be kept charged up to peak AC voltage, which is typically about 40% higher than the average or RMS line voltage value. The line voltage can be switched on or off to the load 2 as needed, by opening and closing the switch S1, and the stored charge can be applied from the capacitors C1 and C2 to the load 2 by selectively opening and closing the switches S2 and S3. In practice, the switches S1, S2, S3 can be implemented as switching transistors or other equivalent devices.

In this case, the load 2 can favorably be the armature of a single phase induction motor. However, the circuit or this invention can also be applied to other loads, including a non-rotating inductive load, such as a solenoid actuator, or to a resistive load, or to a non-linear load such as a discharge or plasma device.

The principles of this invention can be implemented according to the embodiments discussed below.

Figure 2:
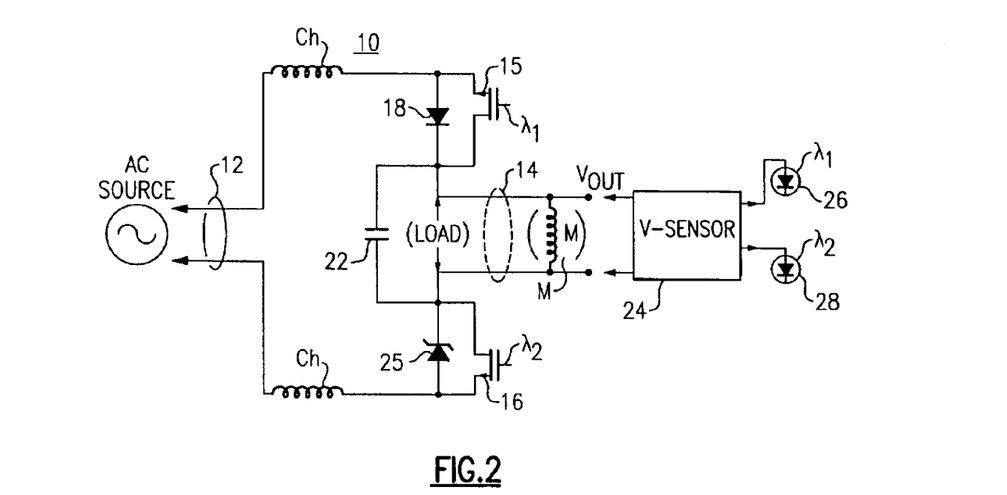
FIG. 2 is a circuit diagram for a speed control drive circuit for an ac induction motor load, according to one possible embodiment of the present invention.

FIG. 2 is a circuit diagram of an illustrative embodiment of a drive circuit 10 connected with a load, here, the armature of an AC induction motor M. Here the line source is a single-phase AC voltage source e.g., a nominal 120 volts AC (RMS) at 60 Hz, i.e., line power. Optional line chokes Ch are shown on each power conductor. The AC line power may be provided from an electric utility, or it may be locally generated, for example, from an emergency generator. For sake of simplicity, a single-phase system is illustrated here, but persons of ordinary skill could easily apply the principles of this invention to polyphase line power, and could apply the invention to a drive system for a three-phase AC induction motor, if desired, or to the main and auxiliary windings of a split-phase motor. The line voltage can be other than 120 volts RMS, e.g., 230 volts, 460 volts, etc. Here, a pair of input conductors 12 are coupled to the AC source, and a pair of output conductors 14 are connected to the motor M or other output load. The input conductors 12 supply input AC line power to first and second power switching transistors 15 and 16, which switchably connect to the output conductors 14. In this embodiment, there are first and second diodes 18 and 20, each respectively coupled in anti-parallel across the source and drain of an associated transistor 15, 16. An optional storage capacitor 22 is connected between the two output conductors 14, and thus in this embodiment is connected with the drain electrodes of the power transistors 15 and 16. The capacitor 22 will charge and discharge depending on the conductive status of the transistors 15 and 16. The transistors 15 and 16 are optically gated, and here any well known optical gating circuits can be connected to them. Alternatively, a pulse transformer system can be used for gating the transistors 15, 16, or an equivalent coupling means can be used that avoids direct DC coupling. The transistor 15 is gated on to admit all or some portion of the negative half cycles, and the transistor 16 is gated on to admit all or some portion of the positive half cycles.

Controller circuitry for this drive circuit 10 includes a voltage sensor 24, whose inputs are placed across the load, i.e., connected to the output conductors 14, and which has output LEDs 26 and 28 that are optically coupled to the respective transistors 15 and 16. In this embodiment, the LEDs 26 and 28 emit different respective wavelengths $\lambda_1$, and $\lambda_2$. The optical couplings can be constituted by suitable LED and photodiode pairs. The voltage sensor 24 may incorporate a processor with code that prohibits both LEDs firing at the same time. The transistors 15, 16 may be cut off during a portion of the power wave to reshape it or to reduce the current flow. This circuit permits the beginning part or the end part of the wave to be trimmed to improve the power factor, which is often a problem factor for inductive loads. The controller circuitry associated with the voltage sensor can, for example, look for zero crossings in the motor current in the output conductors, or in the line current in the input conductors, or both. As discussed later, the sensor circuitry can also detect and measure back EMF pulses at the beginning of the power half waves to determine load and rotor speed.

Figure 3:
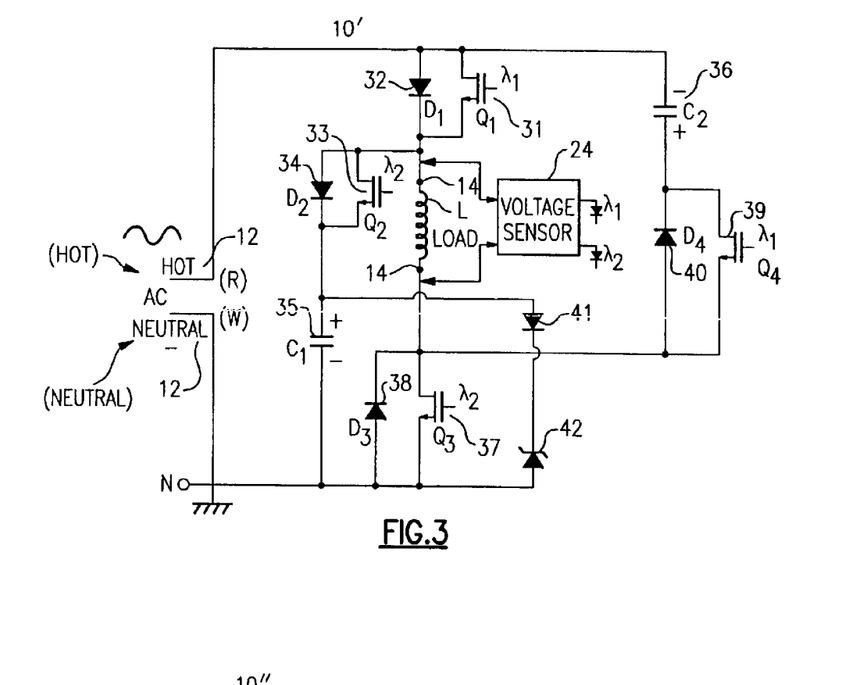
FIG. 3 is a circuit diagram of another embodiment.

FIG. 3 illustrates a motor control circuit 10' according to another embodiment of this invention, which is capable of modifying and enhancing the AC power being supplied to an AC load L, such as an induction motor. Here elements that correspond with elements in the previous embodiment are identified with the same reference numbers. As in the previous embodiment, there are line input conductors 12 and output conductors 14. The input conductors may be connected with the hot and neutral conductors of a 120 volt circuit, and the output conductors may be connected across a motor armature or other AC load. Here, there is a first transistor 31 (i.e. Q1) connected between the hot-side input conductor and one output conductor 14, with a diode 32 connected across the source and drain of the transistor 31. A series circuit formed of a second transistor 33 (with a parallel diode 34) followed by a capacitor 35 extends between the one output conductor 14 and the other (neutral side) input conductor. A second capacitor 36 has one electrode connected to the first or hot input conductor.

A third transistor 37 (i.e., Q3), with parallel diode 38 is connected between the neutral input conductor and the other one of the output conductors 14. A fourth transistor 39 (i.e., Q4) has its source connected to this other output conductor, with a parallel diode 40 between its source and drain, and the capacitor 36 extends in series with this fourth transistor 39 between its drain electrode and the hot side input conductor. Alternatively, the capacitor 35 can be tied to the anode of the transistor 37 (i.e., Q3), and such an embodiment is discussed later in connection with FIG. 4.

In this embodiment, there is a power supply circuit comprising a series pair of a diode 41 and a zener 42, in parallel across the capacitor 35. A similar arrangement may be used in connection with the other capacitor 36. This supplies the power for the MOS transistor gate drives.

Here, there is also a gating arrangement that is optically connected to the transistors 31, 33, 37 and 39, but is not shown here. Transistors 31 and 39, both shown as sensitive to wavelength $\lambda_1$, are turned on and off together, while transistors 33 and 37, here both shown as sensitive to another wavelength $\lambda_2$, are also turned on and off together. The transistors 31 and 39 are kept off whenever the transistors 33 and 37 are on, and vice versa.

A microprocessor control element (not shown) is incorporated into the voltage sensing circuit 24, which has inputs connected to the output conductors, i.e., to the load L. This microprocessor control element may also have a speed selection circuit, for example, contained in a wall thermostat in the case of a heating, air conditioning, and/or heat pump system. Such a microprocessor control element would drive phototransmitters to control the turning on and turning off of the transistors 31, 33, 37, and 39.

In this embodiment, even though there is no traditional bridge or half-bridge for converting power to a different line frequency, the output power can be delivered at a different frequency from line frequency, and its waveshape can be transformed into a desired waveshape. The capacitors continue to charge through the respective diodes during times when the transistors are off, i.e., capacitor 35 is charged on positive half-cycles through diodes 32 and 34, and capacitor 36 is charged on the negative half-cycles through diodes 38 and 40. Line synchronized operation permits the values of capacitors 35 and 36 to be greatly reduced. A voltage boost can be produced at the beginning of each waveform in a line synchronized mode.

Figure 4:
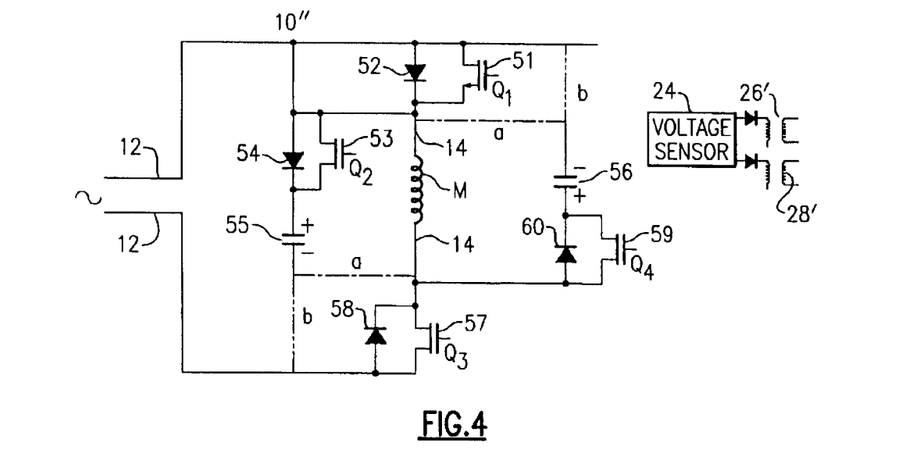
FIG. 4 is a circuit diagram of another embodiment of this invention.

Another embodiment of this invention is shown in FIG. 4, wherein a motor control circuit 10 " is connected to AC input conductors 12 and through AC output conductors 14 to an AC load such as a motor M. In this embodiment, there is a first transistor 51 and first diode connected across its current terminals, and between one of the input conductors and one of the output conductors 14, with a second transistor 53 and second diode 54 from that point to a storage capacitor 55. Similarly, there is a third transistor 57 and third diode 58 between the second AC input conductor and the other AC output conductor, and a fourth transistor 59 and fourth diode 60 from there to one side of a second storage capacitor 56. In this embodiment, electrolytic or similar polarized capacitors are used, and the polarity of the transistors and diodes is such that the diodes 54 and 60 have their cathodes at the (+) terminals of the associated capacitors 55 and 56. The capacitor (−) terminals may be connected either to the output conductors (shown in dash lines as option a) or to the input conductors 12 (shown in dash lines as option b). The transistors 51, 53, 57, and 59 may be gated either electrically or optically, and the control circuitry for that is not shown here. Also, there is a voltage sensor circuit (not shown here) connected with the AC output conductors 14, or with the input conductors 12, or both. In one preferred mode, sensing of the reverse EMF is employed for direct motor sensing. Optionally, there may be a motor speed detector, e.g., a hall effect element, associated with the motor M, and connected with the microprocessor control element. The control circuit 24 may identify zero crossings in the input AC wave to determine what the actual line frequency is, as that can vary several hertz from the nominal frequency, i.e., from 60 Hz in North America or 50 Hz in Europe. As shown schematically, the control circuit 24 can have its outputs linked to the gates of the transistors 51, 53, 57, 59 using pulse transformers 26' and 27'.

The microprocessor control circuit may be suitably programmed to provide gating pulses to optoisolator transmitters and thereby control the frequency and wave shape of the AC output current that is fed to the motor armature.

Figure 5A:
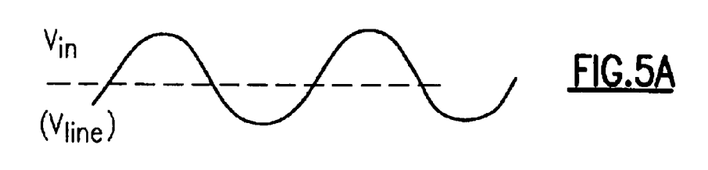
FIGS. 5A to 5E are power waveform charts for explaining operation of this invention.
Figure 5B:
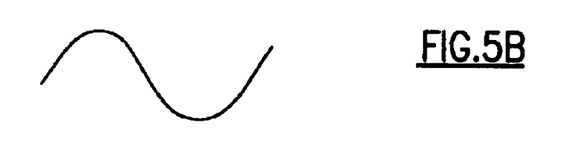
Figure 5C:
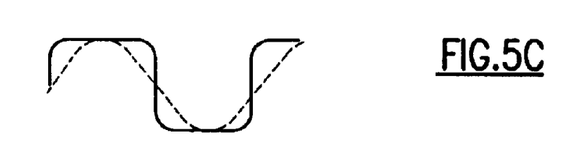
Figure 5D:
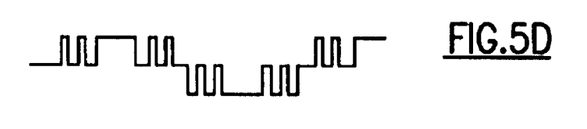

The AC input voltage from the AC source appears on the AC input conductors 12 as a sinusoidal wave, as shown in FIG. 5A, with its nominal frequency at 60 Hz, and with a peak voltage $V_{AC}$ of 330 volts (220 volts RMS). During normal conditions, the transistor 31 (FIG. 2) is gated on during substantially the entire negative half-cycle, and the transistor 37 is gated on during substantially the entire positive half-cycle, and this results in the AC power wave passing, without alteration, to the AC output conductors where it is applied as a drive wave, as shown in FIG. 5B. If there is a need to change the wave shape of the output waveform, the transistors 33 and 39 can be gated on during a portion of the cycle to supply electric charge stored on the capacitors 35 and 36, and to add current at the beginning, at the middle, or at the end of the output power wave, as illustrated in FIG. 5C. The capacitors 35 and 36 will charge up to peak voltage (e.g., 330 volts), and this allows the output voltage to be boosted, when need be, up to the capacitor voltage. By adding a boost voltage at the leading and trailing parts of the AC output wave, a waveshape that approximates a square wave can be created, which has advantages in driving AC induction motors, and particularly when there is a drop in line voltage. As an alternative, the output wave could be provided as a sawtooth waveform (not shown). This reshaped output wave has a desirable advantage during brown-out conditions, i.e., when the peak power drops well below 330 volts, e.g., down to 285 volts (e.g., 190 volts RMS). Under these conditions, the applied line voltage may be too low to power the equipment safely. However, by creating the output wave as generally rectangular pulses (as in FIG. 5C) rather than sinusoidal (as in FIG. 5B), the average applied voltage is above the normal RMS value of the applied voltage, and the motor can be operated safely. The timing of the gating signals to the transistors 31 and 37 can be controlled so as to interrupt the current to create pulses during each half-cycle, as shown for example in FIG. 5D, so that the output power wave has a desired amplitude characteristic for a given torque or load problem. In this instance, the power control is operating as a line-synchronized device.

Figure 5E:
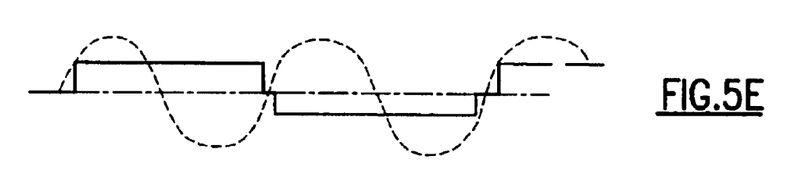

Moreover, by gating the transistors 31, 33, 37 and 39 (FIG. 3) or 51, 53, 57, 59 (FIG. 4) at the appropriate times, it is possible to create an output pulse waveform that has a frequency and voltage that is different from the input line power wave. It is possible to create an output power wave that is double the width (i.e., one-half the frequency) of the original input line power wave, as shown in FIG. 5E, and it is easily possible to create an output power wave with any frequency between these, or even a higher or lower frequency than the input (line) wave. The generation of the waveform of FIG. 5E can be explained by reference to the following table, which represents two full cycles of the input line power and one cycle of the output power. In this case the switching transistors 31 and 39 are held off during positive half cycles of the input line power, and transistor 31 is on only during negative half-cycles. Likewise, transistors 33 and 37 are held off during negative half cycles. The transistors 33 and 37 are turned on in response to an output voltage sensor during the positive half cycles, and the transistors 31 and 39 are turned on in response to output voltage sensor during negative half cycles. The conditions for converting 60 Hz input power to 30 Hz output power are as indicated in the following table:

<See Table I>

The motor speed controller circuit 10" of FIG. 4 would operate in a similar fashion.

The ability of this circuit to produce power of various frequencies means that with this rather simple circuit there could be any number of drive speeds between very low speed to full speed, and even an above normal speed. Moreover, the motor drive could be infinitely variable.

An accelerated, snap-action gating of the transistors 31, 33, 37 or 39 of FIG. 3, or 51, 53, 57, 59 of FIG. 4 can be accomplished, e.g., as discussed in U.S. Pat. No. 6,118,239, for faster and more accurate switching of the transistors. With quick turn on and turn off, the switching transistors spend very little time transitioning across their active regions, thus cutting energy losses and limiting device heating. The arrangement avoids heat management problems for MOSFET or other switching transistors, and permits the speed control circuit to be constructed out of smaller, and less expensive devices, which operate at very low power.

Figure 6:
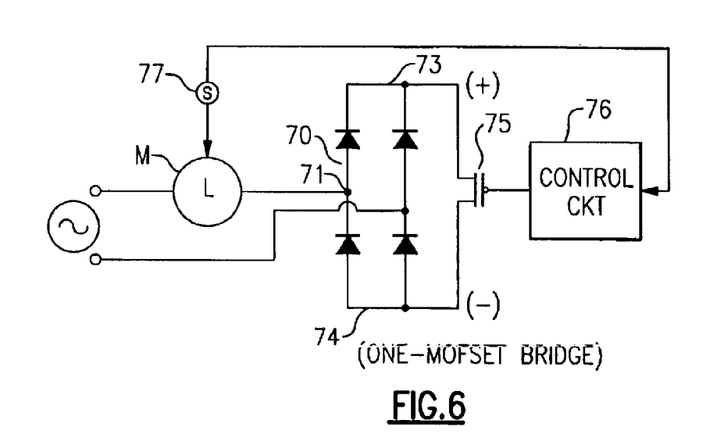
FIG. 6 is a circuit diagram of a single-MOSFET switched embodiment of the present invention.

A single MOSFET bridge embodiment is shown in FIG. 6, in which a diode bridge 70 has AC terminals 71 and 72 and DC terminals 73 and 74. A MOSFET transistor 75 has its drain and source electrodes connected across the bridge 70, i.e., to the DC terminals 73, 74. An AC induction motor M is connected as a load in series between one pole of the AC line current and the bridge AC terminal 71, with the other bridge AC terminal 72 going to the other pole of the AC line. A control circuit 76 has a sensor 77 operatively engaged with the motor M, and provides an appropriate gating signal to the gate of the MOSFET transistor 75.

Figure 7:
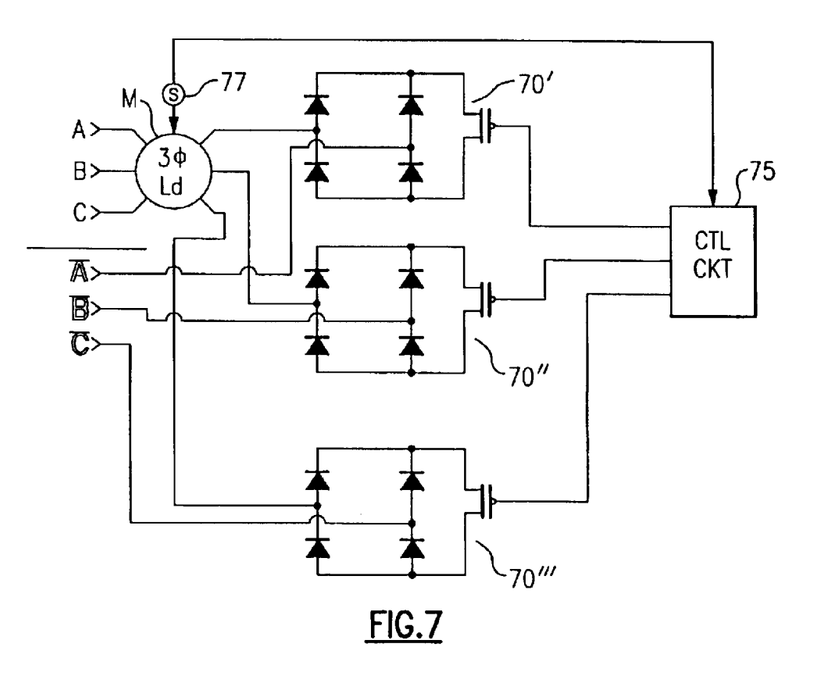
FIG. 7 is a circuit diagram of a three-phase switched bridge embodiment.

A polyphase, i.e., three-phase, version of this embodiment is illustrated in FIG. 7, in which there are three switched bridges 70', 70'', and 70''', each associated with one of the three phases, here indicated as A, B, and C. The three-phase induction motor M is situated in series with each of these bridges, and for each there is a return to an associated phase A, B, C. This is indicated generally to encompass either a delta or wye arrangement. Here the control circuit 76 provides a gating signal for each of the three switched bridges. Many other versions are also possible.

Figure 8A:
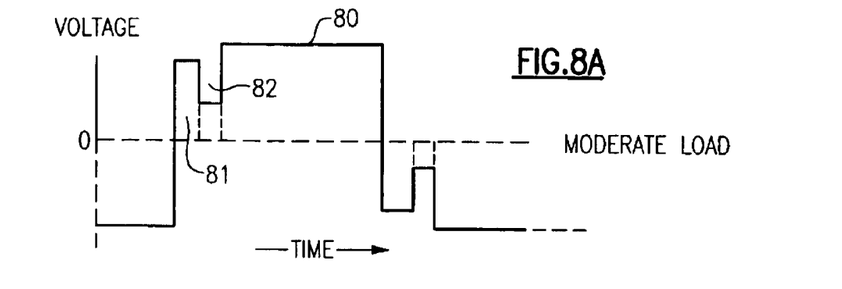
FIGS. 8A to 8D are applied voltage graphs for explaining this invention.
Figure 8B:
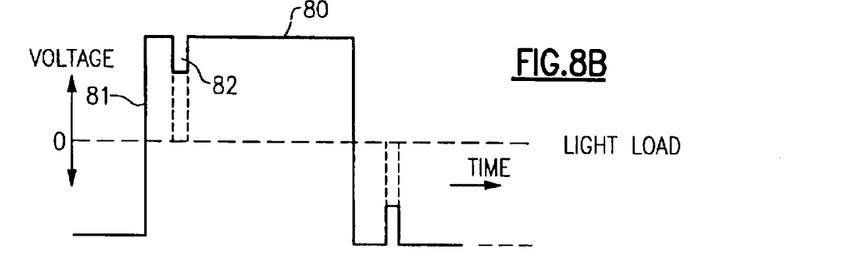
Figure 8C:
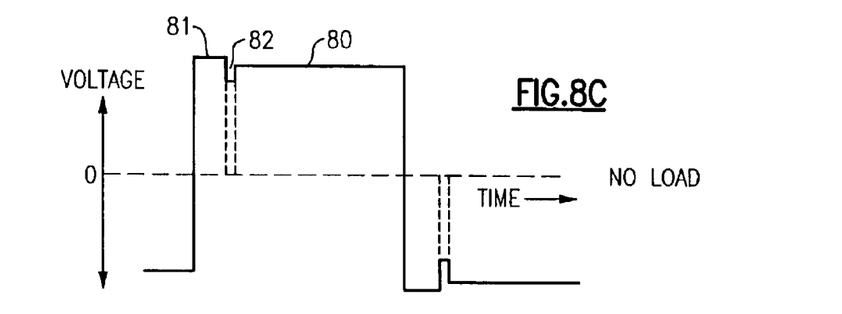
Figure 8D:
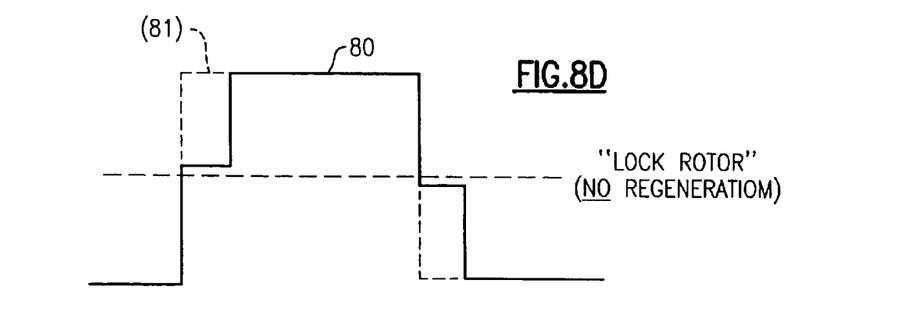

The direct motor speed detecting feature of this invention can be explained with reference to FIGS. 8A to 8D. In each of these, the applied voltage across the motor armature is shown on the vertical axis, and time on the horizontal axis. The current is applied, for example, as positive and negative pulses, with a brief OFF period or space between negative and positive regions. After start up, if the motor is turning normally, with a moderate load, the armature voltage will appear generally as shown in FIG. 8A. At the commencement of each half cycle 80, there is a buffer period during which no current is applied. Because the rotor is magnetized and is rotating, there is a generated voltage imposed on the armature that is a result of rotor slippage. In the case of a moderate load, as illustrated in FIG. 8A, there is a forward voltage spike or pulse 81, followed by a notch 82. The height and duration of the voltage pulse 81, and the depth and width of the notch 82 vary with rotor speed and with the load imposed on the rotor. For a light load (FIG. 8B), the voltage pulse is bigger, i.e., taller and somewhat wider, and the notch 82 is shallower and narrower. At the limit of zero motor load (as shown in FIG. 8C), i.e., in which the rotor spins freely, the initial pulse 81 is a maximum and the notch 82 is a minimum. For larger and larger loads, the pulse 81 becomes narrower and shorter, while the notch 82 becomes wider and deeper. At the extreme of infinite load, i.e. rotor lock, where there is no rotation (as shown in FIG. 8D), the pulse 81 is absent at the beginning of the half cycle 80. This characteristic, i.e., the height and width of the pulse 81 or the depth and width of the notch 82, can be sensed and measured at the beginning of each half cycle, or at selected half cycles, to gauge the load imposed on the motor and to read directly the rotation speed of the rotor. Then, the amplitude and shape of the power wave can be controlled to optimize motor operation under given load conditions.

While the invention has been described in detail with reference to certain preferred embodiments, it should be understood that the invention is not limited to those precise embodiments. Rather, many modifications and variations would present themselves to persons skilled in the art without departure from the scope and spirit of the invention, as defined in the appended claims.

TABLE I

| Input Power | Output Power | D-32 (D1) | Q-31 (Q1) | D-34 (D2) | Q-33 (Q2) | D-38 (D3) | Q-37 (Q3) | D-40 (D4) | Q-39 (Q4) | Cap-35 (C1) | Cap-36 (C2) |
|---|---|---|---|---|---|---|---|---|---|---|---|
| pos ½ | pos ½ | fwd bias | off | fwd bias | on (pulsed) | rev bias | on (pulsed) | rev bias | off | charging/ dis- charging | holding |
| neg ½ | pos ½ | rev bias | off | rev bias | on (pulsed) | fwd bias | on (pulsed) | fwd bias | off | dis- charging | charging |
| pos ½ | neg ½ | fwd bias | on (pulsed) | fwd bias | off | rev bias | off | rev bias | on (pulsed) | charging/ dis- charging | dis- charging |
| neg ½ | neg ½ | rev bias | on (pulsed) | rev bias | off | fwd bias | off | fwd bias | on (pulsed) | holding | charging |

What is claimed is:

1. A power controller for powering an induction electrical machine, comprising:

a first AC conductor and a second AC conductor for connecting to an AC line power source;

a first controlled switch circuit which includes a first controlled switch element having a first power terminal connected to said first AC conductor, a second terminal, and a control input, and a diode connected in shunt across the power terminals thereof;

a second controlled switch circuit which includes a second controlled switch element having a first power terminal connected to said second AC conductor, a second terminal, and a control input, and a diode connected in shunt across the power terminals thereof;

a power capacitor having terminals connected to the second power terminals of said first and second controlled switch elements, respectively;

load terminals coupled to the terminals of said power capacitor; and a control circuit having at least one output coupled to the control inputs of said first and second controlled switch elements, and at least one sensor input connected to at least one of said load terminals.

2. The power controller according to claim 1 wherein said first and second controlled switching elements each include a switching transistor.

3. The power controller according to claim 2 wherein said switching transistor is a MOSFET bipolar transistor.

4. The power controller according to claim 2 wherein said switching transistor is an IGBT.

5. The power controller according to claim 2 wherein said switching elements include at least one semiconductor transistor across an associated one of said diodes.

6. The motor speed controller according to claim 1, also comprising optical means coupling said control circuit with the control inputs of said first and second controlled switch elements.

7. The motor speed controller according to claim 1, comprising non-optical, non-DC coupling means coupling said control circuit with the control inputs of said first and second controlled switch elements.

8. A motor speed controller for powering an AC induction motor, comprising:
 a first AC conductor and a second AC conductor for connecting to a source of AC line power;
 a first controlled switch circuit which includes a first controlled switch element having a first power terminal connected to said first AC conductor, a second power terminal, and a control input, and a first diode connected in shunt across said power terminals thereof;
 a second controlled switch circuit which includes a second controlled switch element having a first power terminal connected to said second AC conductor, a second power terminal, and a control input, and a second diode connected in shunt across said power terminals thereof;
 a first power capacitor having a first terminal and a second terminal, with a third controlled switch disposed between the first terminal of said first power capacitor and the second power terminal of the first controlled switch element, said third controlled switch circuit including a third controlled switch element and a third diode connected in shunt across said third controlled switch element;
 a second power capacitor having a first terminal and a second terminal, with a fourth controlled switch circuit disposed between the first terminal of said second power capacitor and the second power terminal of the second controlled switch element, said fourth controlled switch circuit including a fourth controlled switch element and a fourth diode connected in shunt across said fourth controlled switch element, said third and fourth controlled switch elements each having a respective control input;
 output terminals coupled to the second power terminals of said first and second controlled switch elements; and
 a control circuit having at least one output coupled to the control inputs of said first, second, third, and fourth controlled switch elements, and at least one sensor input connected to at least one of said load terminals.

9. A power controller according to claim 8, wherein said the second terminals of said first and second power capacitors are coupled to said second AC conductor and said first AC conductor, respectively.

10. A power controller according to claim 8, wherein said the second terminals of said first and second power capacitors are coupled to the second power terminals of said second controlled switch element and of said first controlled switch element, respectively.

11. A power controller according to claim 8, wherein optical means couple the control circuit to the first, second, third and fourth controlled switch elements.

12. A power controller according to claim 8, wherein non-optical, non-DC coupling means couple the control circuit to the first, second, third and fourth controlled switch elements.

13. Power controller for powering an induction motor or similar load, comprising
 input means for connecting with a source of AC line power, said line power having a waveform and a line frequency;
 output means adapted to connect to an AC load;
 variable drive circuit means receiving line power from said input means and delivering AC power via said output means to said AC load; said variable drive means including means for storing and switching at least a portion of said line power and selectively passing said line power to said output means in a plurality of modes, including (a) said input AC line power being applied directly to said load; (b) said input AC line power being applied to said load with current added at portions of said waveform to reshape the AC waveform at said line frequency; and (c) a reshaped sinusoidal or non-sinusoidal waveform being applied to said load at a frequency that is different from said line frequency; and said variable drive circuit means including a control circuit having sensor inputs coupled across said load at said output means for continuously monitoring and controlling the waveform and frequency of the power applied to said load.

14. Power controller for powering an induction motor or similar load, comprising
 input means for connecting with a source of AC line power, said line power having a waveform and a line frequency;
 output means adapted to connect to an AC load;
 variable drive circuit means receiving line power from said input means and delivering AC power via said output means to said AC load; said variable drive means including means for storing and switching at least a portion of said line power and selectively passing said line power to said output means in a plurality of modes, including (a) said input AC line power being applied directly to said load; (b) said input AC line power being applied to said load with current added at portions of said waveform to reshape the AC waveform at said line frequency; and (c) a reshaped sinusoidal or non-sinusoidal waveform being applied to said load at a frequency that is different from said line frequency; and said variable drive circuit means including a control circuit having sensor inputs coupled to said output means for monitoring and controlling the waveform and frequency of the power applied to said load;
 wherein said variable drive circuit means includes first and second optically driven switch circuits each coupled between a respective AC input conductor and a respective output conductor of said output means, and a pair of diodes connected across current-carrying conductors of said first and second optically driven switch circuits, respectively.

15. Power controller according to claim 14 wherein variable drive circuit means includes a capacitor and an optically controlled switch in series therewith and coupled to one of said output conductors.

16. Power controller according to claim 14 wherein said control circuit includes optical switching means optically coupled to said optically driven switches.

17. Power controller for powering an induction motor or similar load, comprising a first AC conductor and a second AC conductor for connecting to an AC line power source;

a controlled switched bridge, including a bridge element having at least first and second AC inputs, and DC terminals, and a switch element connected across the DC terminals of the switched bridge element;

a control circuit having an input sensor connected across said load for providing gating signals for selectively gating the switch element of the controlled switched bridge; and means in series with said AC conductors for coupling across an armature of said AC induction motor.

18. Power controller for powering an induction motor or similar load, comprising a first AC conductor and a second AC conductor for connecting to an AC line power source;

a controlled switched bridge, including a bridge element having at least first and second AC inputs, and DC terminals, and a switch element connected across the DC terminals of the switched bridge element;

a control circuit for providing eating signals for selectively gating the switch element of the controlled switched bridge; and means in series with said AC conductors for coupling across an armature of said AC induction motor; and further comprising sensor means coupled to an input of said control circuit for providing a motor speed input signal to said control circuit based on a sensed condition of said AC load.

19. The power controller of claim 18, wherein said bridge element includes a diode bridge, and said switch element includes a MOSFET having a drain and a source respectively connected to said DC terminals.

20. Power controller for powering an induction motor or similar load, comprising input means for connecting with a source of AC line power, said line power having an AC waveform;

output means adapted to connect to an AC load;

variable drive circuit means receiving line power from said input means and delivering AC power via said output means to said AC load; said variable drive means including means for storing and switching at least a portion of said line power and selectively passing said line power to said output means in a plurality of modes, including (a) said input AC line power being applied directly to said load; and (b) said input AC line power being applied to said load with current added at portions of said waveform to reshape the AC waveform; and said variable drive circuit means including a control circuit having sensor inputs coupled across said load at said output means for continuously monitoring and controlling the waveform and frequency of the power applied to said load.

* * * * *

UNITED STATES PATENT AND TRADEMARK OFFICE
CERTIFICATE OF CORRECTION

PATENT NO.   : 6,753,670 B2
DATED        : June 22, 2004
INVENTOR(S)  : Andrew S. Kadah It is certified that error appears in the above-identified patent and that said Letters Patent is hereby corrected as shown below:

<u>Column 13,</u>
Line 26, "eating" should read -- gating --

Signed and Sealed this

Sixteenth Day of November, 2004

JON W. DUDAS
*Director of the United States Patent and Trademark Office*